R. E. WETTER.
SIGNALING DEVICE.
APPLICATION FILED DEC. 18, 1918.
1,330,929.
Patented Feb. 17, 1920.
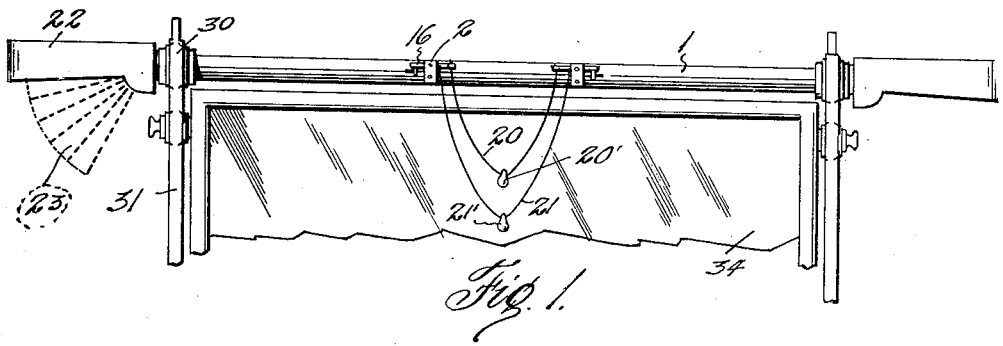
Fig. 1.
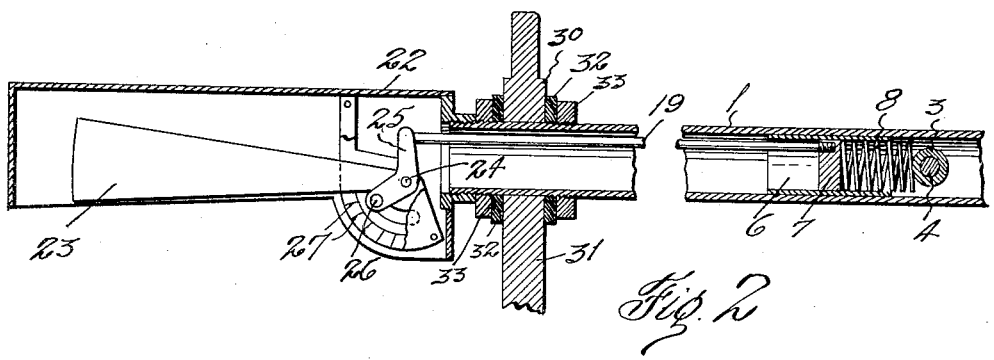
Fig. 2.
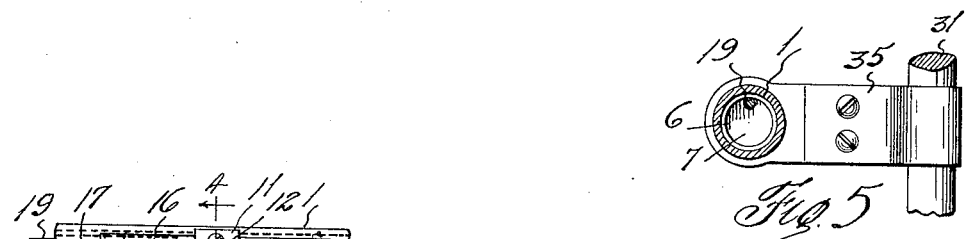
Fig. 3.
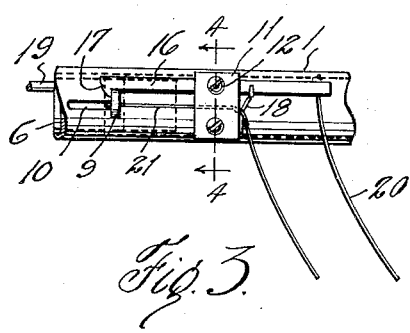
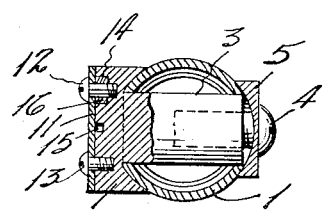
Fig. 5.
Fig. 4.
Inventor
R. E. WETTER.
By
Jack A. Ashley
Attorney

UNITED STATES PATENT OFFICE.

RALPH E. WETTER, OF DALLAS, TEXAS, ASSIGNOR TO UNIVERSAL TRAFFIC CONTROL COMPANY, OF DALLAS, TEXAS, (A TRUST ESTATE.)

SIGNALING DEVICE.

1,330,929.   Specification of Letters Patent.   Patented Feb. 17, 1920.

Application filed December 18, 1918. Serial No. 267,237.

*To all whom it may concern:*

Be it known that I, RALPH E. WETTER, a citizen of the United States, residing at Dallas, in the county of Dallas and State of Texas, have invented certain new and useful Improvements in Signaling Devices, of which the following is a specification.

This invention relates to improvements in direction signals for vehicles and common carriers and particularly to such devices which include a normally concealed signal arranged to be displayed on the side of the vehicle or carrier to indicate a turn or a full stop.

While many theories have been advanced as to the proper location of a vehicle signal I have concluded that the signal should be located at the front within the vision of the driver as well as the drivers of vehicles approaching from the opposite direction. In order to be practical and not to interfere with the operation of the vehicle or obscure the vision of the driver the structure must be compact and properly located. In the case of automobiles and trucks the signal targets or devices should be disposed so as to project from each side of the windshield, with the operating means arranged therebetween within convenient reach of the driver and yet so located as to prevent accidental operation and to obviate interference with any of the operating parts of the vehicle. The structure must be capable of instant operation and the operating parts must be differentiated so as to be instantly selected and easily manipulated.

In carrying out the invention a signal device is devised to be displayed at each side of a windshield or similar structure as the front of a street car; however the invention has to do with the signal operating means rather than the target, flag, semaphore or other signal device. The operating means includes means for normally holding the signal devices concealed or inoperative, means for releasing to display either or both of said devices, and means for restoring said devices to their normal positions. I lay particular stress upon a single pendant flexible connection having its end connected with the releasing means, and a single pendant flexible connection having its ends connected with the restoring means, one of the connections having such differentiation from the other as to preclude confusion and to enable the driver to instantly select the one desired. Further the single connection will operate either signal by reverse pulling or will operate both signal devices. However I do not wish to be limited to a flexible connection for operating the signal devices.

A more specific embodiment of the invention includes a tube attached to or made a part of the windshield and arranged to display a signal at each end of the tube, said signals normally being held under spring tension. Releasing levers are mounted on the tube normally holding spring pressed plungers under restraint and said plungers are connected with the signal devices. Means is also employed for retracting the released plungers and again placing them under spring tension as well as under the control of the releasing levers.

The invention will be more readily understood from a reading of the following specification and by reference to the accompanying drawings, in which an example of the invention is illustrated, and wherein—

Figure 1 is a view in elevation of a signal arrangement constructed in accordance with this invention and forming a part of a windshield, Fig. 2 is an enlarged longitudinal sectional detail, Fig. 3 is a detail of the releasing lever and restoring means, Fig. 4 is a cross sectional detail on the line 4—4 of Fig. 3, and Fig. 5 is a cross sectional detail showing the bracket for using the signal as an attachment to a windshield.

This invention is in part a continuation of my application filed November 26, 1915, Serial No. 63423, the improvements herein set forth being predicated on the original disclosure of the invention.

In the drawings the numeral 1 designates a tube or casing which is open at each end and is arranged to be mounted on the windshield of a motor vehicle in a suitable manner. On each side of the center of the tube a transverse block 2 is mounted. Each block has a head shaped to fit the exterior of the tube and is provided with a shank 3 extending transversely through the tube and receiving a screw 4 bearing against the washer 5 on the front side of the tube whereby the block is fixed in position.

As the structure on each side of the tube is the same a description of one side will be sufficient for both. A plunger sleeve 6 is provided intermediate its ends with a fixed head 7. A coiled spring 8 received in the plunger and bearing against the head has its opposite end protruding from the plunger and bearing against the shank 3 of the block. An eye 9 disposed on the outside of the tube passes through a slot 10 in the tube and is fastened to the plunger at the head. The spring 8 tends to force the plunger outward toward the outer end of the tube and when said plunger is moved inward the spring is compressed and the plunger and any part attached thereto are thus placed under tension. The plunger is long enough at all times to cover the slot 10.

The face of the block 2 is flat and receives a covered plate 11 held thereon by screws 12 and 13 respectively. The head of the block is provided with a recess 14 near its upper end and a central recess 15 at its center. A releasing lever 16 has its central portion pivoted in the recess 14 on the screw 12. The outer end of the lever has a hook 17 with which the eye 9 may be engaged when the plunger 6 is drawn inward to place the spring 8 under tension. A small spring 18 secured to the lever bears against the side of the block 2 and acts to hold the lever in a horizontal position. A longitudinal rod or arm 19 has its inner end fixed to the upper portion of the head 7 while its outer end extends to the outer end of the tube where it may be suitably attached to the signal device which is used.

It is obvious that by pulling the inner end of the lever 16 downward the outer end carrying the hook 17 is elevated thus releasing the eye 9 and permitting the compressed spring 8 to displace the plunger 6 longitudinally of the tube toward its outer end, whereby the arm 19 is displaced outward and thus operates the signal attached thereto. I attach one end of a flexible connection 20 to the lever 16 and thus a single connection is used between both of the levers 16. A single flexible connection 21 has its end portions passing through the recesses 15 in the blocks and fastened to the eyes 9. The flexible connections 20 and 21 are ample enough to depend as shown in Fig. 1 and carry knobs 20' and 21' at the center of their looped portions. The driver by grasping either knob may operate the connection attached thereto. When one of the eyes 9 is released it is carried to the outer end of its slot 10 and by pulling on the knob 21' in a direction to exert a pull on that end of the connection which is attached to the released eye the latter is retracted or drawn inward until it rides under the hook 17 and is held; whereby the plunger is retracted, the spring again compressed and the arm 19 placed under tension. It is obvious that by pulling straight down on the knob 21' both plungers could be simultaneously restored. Either lever 16 is operated by pulling the knob 20' downward in a direction such as to operate said lever or by pulling the knob straight down both levers are operated. It will be seen that this is a very simple yet instantaneous means of operation, and in order that the selection of the proper knob may be instantly carried out I have made each knob and its connection of such a color as to contrast with the other knob and its connection thus enabling the driver to select the proper operating means at a glance. This is a very important point as the driver of a motor vehicle will often be called upon to do some very quick manipulating in operating the signal device.

As an illustration of a signal device I have shown each end of the tube screwed into a housing 22 in which a semaphore signal composed of a plurality of blades 23 is normally concealed. The blades are pivoted at their inner ends on a transverse shaft 24 on which a yoke 25 has its upper end pivoted to the outer end of the arm 19 in each instance, and carries a cross bar 26 at its lower end which supports the sectors. When one of the rods 19 is displaced outward by the release of the plunger the yoke 25 is swung so that the bar 26 is carried downward thus permitting the sectors to swing downward and be displayed. Stepped stops 27 are mounted in the housing in the path of the falling sectors and act to arrest the same so that they will be held in fan order when swung downward. When the plunger is retracted and the arm 19 drawn inward the yoke 25 is swung upward so that the bar 26 successively engages and swings the sectors upward into the housing. It is obvious that any other suitable signal device could be operated by the rod 19 and no claim is made to the specific form of signal device used.

In Figs. 1 and 2 I have shown the tube 1 supported in eyes 30 formed at the upper ends of the standards 31 of an ordinary windshield. Rubber washers 32, mounted on the tube bear against each side of each eye while lock-nuts 33 threaded on the tube bind the washers against the eye and fasten the tube in place. This arrangement has the particular advantage of adding a rigid cross brace to the top of the windshield thus improving a construction which at present is quite weak. In using this form of construction the upper member 34 of the windshield would have to be lowered to permit the tube 1 to be inserted thereabove. In

Fig. 5 I have shown the tube fastened in a bracket-clamp 35 which is adapted to be secured to the standards 31 so that the tube can be applied as an attachment to the present windshield as will be obvious.

What I claim is,

1. In a signaling structure of the character described, a tubular casing, signal arms slidably confined within the tubular casing, a hollow plunger provided with a solid head attached to each signal arm, a stationary element fixed in the tubular casing, a compression spring contained within the plunger and protruding therefrom, said spring being confined between the plunger and the stationary element, a retracting means for drawing the signal arm and plunger inward in the casing to compress said spring and restore the signal, and a releasing means for releasing the plunger which is under tension.

2. In a signaling structure of the character described, the combination with a tubular casing, of a pair of signal arms slidably disposed within the tubular casing, hollow plungers attached to the inner extremities of the arms, compression springs confined within each hollow plunger and protruding therefrom, fixed stops for the springs each of which is confined between its plunger and its stop, means for releasing the plungers simultaneously arranged to also release each plunger independently for operating the signal arms either simultaneously or one at a time, and means for retracting the plungers to compress said springs and restore the signals.

3. In a signaling structure of the character described, a tube arranged to be mounted transversely of the windshield of a motor vehicle, normally concealed signal devices disposed at the outer ends of the tube, plungers arranged to slide in the tube, signal operating arms connected with the plungers and extending through the tube to a point of connection with the signal devices for operating the same, a compression spring carried by each plunger, a fixed stop in the tube for each spring which is compressed against said stop when the plunger is drawn inward, releasing levers mounted on the tube and normally holding the plungers under tension of the springs whereby the signals are concealed, a single flexible connection having its ends attached to the levers and pendent therefrom whereby said levers may be independently or simultaneously operated by a varying manipulation of the same connection to release the plungers, and a second flexible connection having its ends connected with the plungers so as to be manipulated to either independently or simultaneously restore the said plungers.

4. In a signaling structure of the character described, a tube arranged to be mounted transversely of the windshield of a motor vehicle, normally concealed signal devices disposed at the outer ends of the tube, plungers arranged to slide in the tube, signal operating arms connected with the plungers and extending through the tube to a point of connection with the signal devices for operating the same, a compression spring carried by each plunger, a fixed stop in the tube for each spring which is compressed against said stop when the plunger is drawn inward, releasing levers mounted on the tube and normally holding the plungers under tension of the springs whereby the signals are concealed, and a single flexible connection having its ends attached to the levers and pendent therefrom whereby said levers may be independently or simultaneously operated by a varying manipulation of the same connection to release the plungers, a second flexible connection having its ends connected with the plungers so as to be manipulated to either independently or simultaneously restore the said plungers, the said flexible connections each having a means for differentiating it from the other connection whereby it may be instantly selected.

5. In a signaling device, a pair of normally concealed signal devices, means for releasing the signal devices whereby they are displayed, means for restoring the signal devices to their normal positions, a single flexible connection having its ends attached to the releasing means of each signal device for separately or simultaneously releasing the signal devices, and a second flexible connection having its ends attached to the restoring means of each signal device for separately or simultaneously restoring the signal devices, said connections being distinguished.

6. In a signaling device, a tubular casing, a signal arm slidably confined in the casing, a slidable member in the casing to which the arm is attached, a fixed element in the casing, a compression spring confined between the member and the fixed element, the casing having a longitudinal slot, an eye exterior of the casing engaging the sliding member through the slot, a spring pressed latch mounted on the casing and engaging the eye, a flexible connection attached to the latch for operating the same, and a separate flexible connection attached to the eye for retracting the slidable member.

In testimony whereof I affix my signature.

RALPH E. WETTER.